(No Model.)
J. C. THORNTON.
APPARATUS FOR CLEANING OILS.
No. 313,693. Patented Mar. 10, 1885.
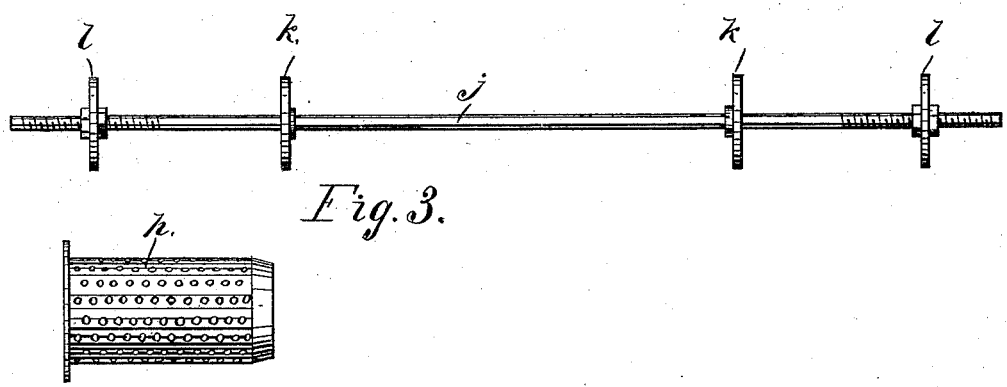
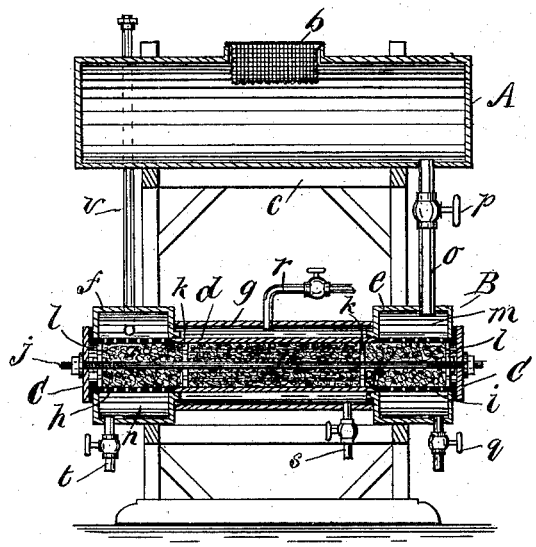
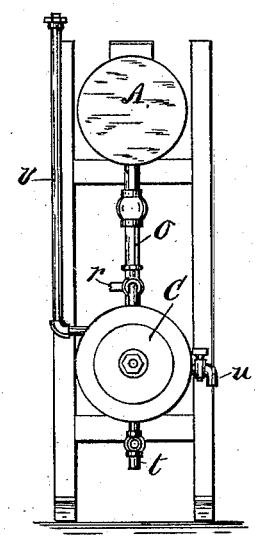
Witnesses:
A. M. Hood.
M. Carsten
Inventor:
John C. Thornton
By H. P. Hood
Atty.

UNITED STATES PATENT OFFICE.

JOHN C. THORNTON, OF MOUNT VERNON, INDIANA.

APPARATUS FOR CLEANING OILS.

SPECIFICATION forming part of Letters Patent No. 313,693, dated March 10, 1885.

Application filed December 15, 1884. (No model.)

*To all whom it may concern:*

Be it known that I, JOHN C. THORNTON, a citizen of the United States, residing at Mount Vernon, in the county of Posey and State of Indiana, have invented a new and useful Improvement in Apparatus for Cleaning Oils, of which the following is a specification.

My invention relates to an improved apparatus for cleaning oil, and which is particularly designed for cleaning oil which has been used upon machinery and in the processes of manufacturing.

The object of my improvement is to combine with a convenient receptacle and means for heating oil in the same during the process of filtration filters, which may be easily withdrawn for cleansing or renewal, and settling-chambers, in which any water or any particles of foreign matter which may have escaped the filters may be deposited and easily withdrawn therefrom.

The accompanying drawings illustrate my invention.

Figure 1 represents a vertical longitudinal section of my device; Fig. 2, an end elevation; Fig. 3, an enlarged view of the filter in detail.

A is a horizontal cylindrical tank having an opening in the upper side protected by a strainer, $b$. Said tank is for the purpose of receiving and storing the oil to be cleaned, and is placed on a suitable frame, $c$, above the filtering-tank B, for the purpose of forcing the oil through the filters by hydrostatic pressure. Tank B is formed with a central cylinder, $d$, to which are connected at each end enlarged cylindrical chambers $e$ and $f$. Cylinder $d$ is inclosed in a steam-jacket, $g$. I prefer to make said cylinder and enlarged chambers as follows: I use for the portion $d$ a metal tube having screw-threads at both ends. Chambers $e$ and $f$ are formed of sheet or cast metal, each having in one end a central re-enforced portion, which is also screw-threaded to fit the threads on the tube. The steam-jacket $g$ is a tube open at both ends and of larger diameter than tube $d$. Tube $g$ is slipped over tube $d$, and the chambers $e$ and $f$ are then screwed onto the tube $d$, forming steam-tight joints against the ends of tube $g$ and sustaining said tube concentric with tube $d$, and forming a steam-tight annular chamber between the two tubes. Into each end of tube $d$ are inserted removable perforated tubes $h$ and $i$, thus forming annular chambers $m$ and $n$. Said tubes extend through the chambers $e$ and $f$, and are flanged on their outer ends, which flange rests against the outer end of the chamber. The filter consists of a rod, $j$, each end of which is screw-threaded, four perforated disks, $k\ k$ and $l\ l$, and a filtering material secured between said disks. I find that the best results are produced by using as said filtering material woolen batting or felt wrapped around the rod between disks $k$, to form a roll of the same diameter as the disks, and having between the layers of wool thin layers of wood sawdust. Between the disks $l\ k$, I use wool alone. Said disks are of the same diameter as the interior of tubes $d$, $h$, and $i$. The rod $j$ is passed through the centers of the disks, disks $k\ k$ being secured thereto at a little less distance apart than the length of tube $d$, and disks $l$ being at such a distance from disks $d$ as to stand just within the outer ends of tubes $h$ and $i$, where they are secured between threaded collars screwed on the rod. The filtering material having been secured on the rod, it is pushed into the tubes $h$ and $i$ through tube $d$, filling said tubes, and the rod projecting at both ends. Covers C C are now placed over the ends of tubes $h$ and $i$, forming tight joints against the ends of the chambers $e$ and $f$, and held in place by nuts screwed on the ends of rod $j$. Tank A is connected with annular chamber $m$ by a pipe, $o$, in which is a stop-cock, $p$. $q$ is a waste-pipe. $r$ is a steam-supply pipe, through which steam enters jacket $g$, and $s$ is a waste-pipe. $t$ is a waste-pipe leading from the bottom of annular chamber $n$, and $u$ is a faucet inserted in chamber $n$, about half-way between the top and bottom of said chamber. Pipes $r$, $s$, and $t$ are all closed by suitable stop-cocks.

For the purpose of causing the oil to flow freely toward chamber $n$, I connect an open pipe, $v$, with said chamber and extend said pipe upward above tank A. I provide at the top of said pipe a suitable coupling, so that a steam-pipe may be connected therewith for the purpose of blowing out and cleaning chamber $n$ when occasion requires.

The operation of my device is as follows: Steam connection having been made with the steam-jacket $g$, the oil to be cleaned is poured into tank A, the larger particles of dirt (such as would clog the pipes) being retained by the strainer $b$. The oil flows from tank A, through pipe $o$, into annular chamber $m$, where any water which is present collects with the coarse dirt below the perforated tube $h$ and is drawn off through the pipe $q$. While in this chamber the oil becomes warmed and more fluid and passes through the perforations in tube $h$ and the filtering material to the annular chamber $n$, being further heated and liquefied while passing through tube $d$. In chamber $n$ any impurity or water which may have passed the filter collects in the lower part of said chamber and is drawn off through waste-pipe $t$, while the cleaned oil is drawn off through faucet $u$. When the filtering material becomes foul, by removing covers C the entire filter may be withdrawn and easily cleaned, and by removing tubes $h$ and $i$ access is had to the whole interior.

With this device the same oil may be used repeatedly and a great saving effected.

I claim as my invention—

1. An oil-cleaning device consisting of the following elements, namely: an elevated receiving-tank having a pipe-connection with a filtering-tank placed below said receiving-tank, said filtering-tank having a central cylinder with perforated extensions of said cylinder at each end thereof, and closed annular chambers surrounding said perforated extensions, filtering material filling said central cylinder and its extensions, and suitable waste-pipes, as shown and described, all combined and adapted to co-operate substantially as specified.

2. An oil-cleaning device consisting of the following elements, namely: an elevated receiving-tank having a pipe-connection with a filtering-tank placed below the receiving-tank, said filtering-tank having a central cylinder with perforated extensions of said cylinder at each end thereof, and closed annular chambers surrounding said perforated extensions, a steam-jacket surrounding said central cylinder, and filtering material filling said cylinder and its extensions, all combined and adapted to co-operate substantially as specified.

3. In an oil-cleaning device, the combination, substantially as specified, of cylinder $d$, annular chambers $m$ and $n$, perforated tubes $h$ and $i$, rod $j$, disks $k\ k$ and $l\ l$, filtering material embraced between said disks, and covers C C.

4. In an oil-cleaning device, the filtering device consisting of a central rod, two inner and two outer retaining-disks mounted on said rod, alternate layers of wool and wood sawdust wrapped about the middle portion of said rod between said inner retaining-disks, and wool alone wrapped about the ends of said rod and between said inner and outer disks, all combined substantially as specified.

5. In an oil-cleaning device, the combination, with an elevated receiving-tank, a filtering-tank placed below said receiving-tank and having a pipe-connection therewith, and filtering material in said filtering-tank, of an open pipe connected with the interior of said filtering-tank and extending above said receiving-tank, substantially as and for the purpose specified.

JOHN C. THORNTON.

Witnesses:
HENRY C. BARTER,
J. L. SHORE.